US011699542B2

(12) United States Patent
Takahashi

(10) Patent No.: US 11,699,542 B2
(45) Date of Patent: *Jul. 11, 2023

(54) DUST CORE

(71) Applicant: TDK Corporation, Tokyo (JP)

(72) Inventor: Takeshi Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 346 days.

This patent is subject to a terminal disclaimer.

(21) Appl. No.: 16/991,527

(22) Filed: Aug. 12, 2020

(65) Prior Publication Data

US 2021/0057139 A1 Feb. 25, 2021

(30) Foreign Application Priority Data

Aug. 21, 2019 (JP) ................................ 2019-151206
Jul. 6, 2020 (JP) ................................ 2020-116657

(51) Int. Cl.
| | | |
|---|---|---|
| *H01F 27/255* | (2006.01) | |
| *H01F 3/08* | (2006.01) | |
| *H01F 1/147* | (2006.01) | |
| *B22F 1/17* | (2022.01) | |
| *H01F 1/24* | (2006.01) | |
| *B22F 1/16* | (2022.01) | |
| *B22F 1/052* | (2022.01) | |
| *B22F 1/10* | (2022.01) | |
| *B82Y 30/00* | (2011.01) | |
| *B82Y 40/00* | (2011.01) | |

(52) U.S. Cl.
CPC ............ *H01F 27/255* (2013.01); *B22F 1/052* (2022.01); *B22F 1/10* (2022.01); *B22F 1/16* (2022.01); *B22F 1/17* (2022.01); *H01F 1/14766* (2013.01); *H01F 1/24* (2013.01); *H01F 3/08* (2013.01); *B22F 2301/35* (2013.01); *B22F 2302/30* (2013.01); *B22F 2304/10* (2013.01); *B82Y 30/00* (2013.01); *B82Y 40/00* (2013.01)

(58) Field of Classification Search
CPC ...... H01F 27/255; H01F 1/14766; H01F 1/24; H01F 3/08; B22F 1/052; B22F 1/12; B22F 1/16; B22F 1/10; B22F 2302/30; B22F 2304/10
See application file for complete search history.

(56) References Cited

U.S. PATENT DOCUMENTS 8,328,955 B2   12/2012  Wakabayashi et al.
11,440,093 B2 *  9/2022  Takahashi ............... H01F 1/147
(Continued)

FOREIGN PATENT DOCUMENTS

JP    2017-188678 A    10/2017
JP    2019-192868 A    10/2019
WO    WO 2010/082486   *  7/2010

*Primary Examiner* — C Melissa Koslow
(74) *Attorney, Agent, or Firm* — Faegre Drinker Biddle & Reath LLP

(57) ABSTRACT

The dust core comprises a plurality of soft magnetic iron-based particles, a coating layer disposed on each of the surfaces of the soft magnetic iron-based particles, an interstitial layer disposed between the coating layers, and a nanopowder disposed between the soft magnetic iron-based particles. The coating layer is a layer of a compound comprising Fe, Si, O, B and N; and the nanopowder is a powder of a compound comprising O, N and at least one element selected from the group consisting of Fe, Si, Zr, Co, Al, Mg, Mn and Ni.

6 Claims, 1 Drawing Sheet

(56) References Cited

U.S. PATENT DOCUMENTS

2011/0272622 A1 11/2011 Wakabayashi et al.
2019/0131040 A1 5/2019 Ikeda et al.
2019/0333666 A1 10/2019 Nakamura

* cited by examiner

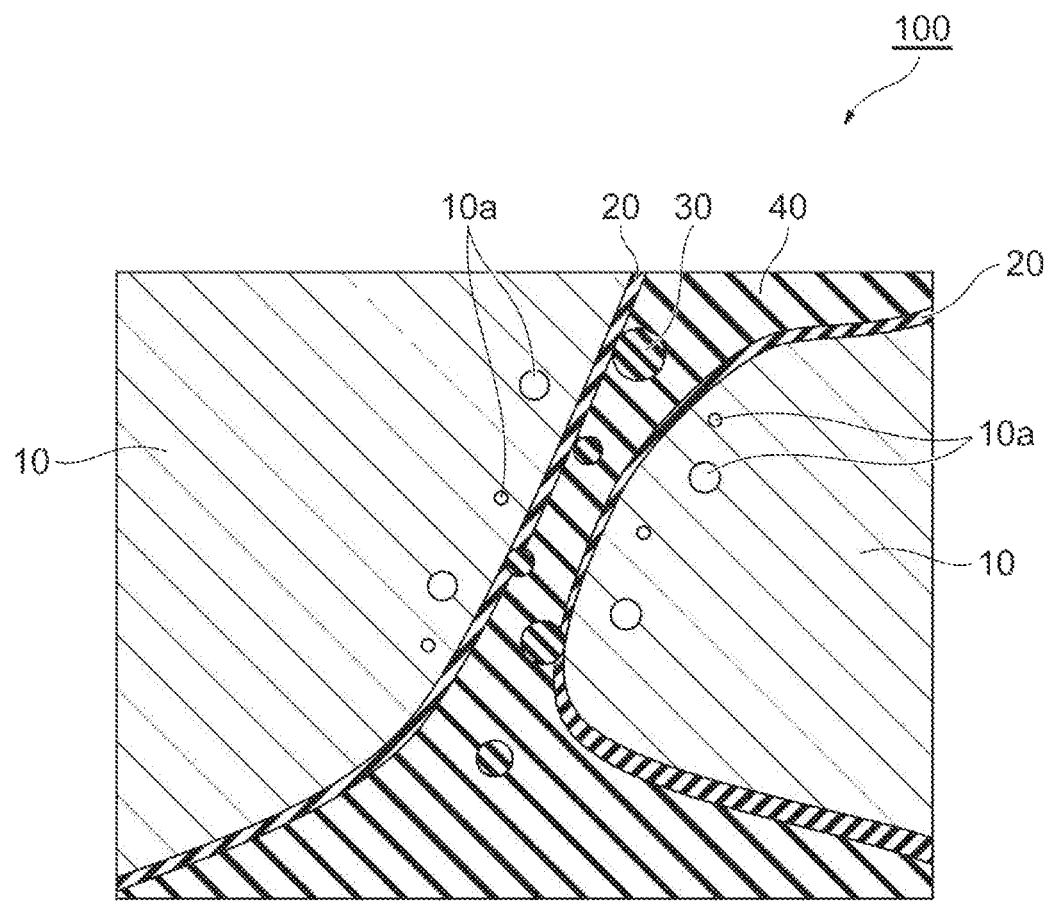

DUST CORE

TECHNICAL FIELD

The present invention relates to a dust core.

BACKGROUND

Along with downsizing and weight saving of electrical equipment, magnetic materials for use in electronic components such as choke coils, reactors, motors and inductors are required to have a low magnetic loss (core loss) and a high magnetic permeability. In order to achieve improvement in magnetic permeability and reduction in magnetic loss, various dust cores have been developed.

For example, in Patent Literature 1, a composite magnetic material including a metal magnetic material having a Vickers hardness (Hv) in the range of 230≤Hv≤111000 and an insulating material having a compressive strength of 10000 kg/cm$^2$ (980.07 MPa) or less is disclosed.

In Patent Literature 2, a dust core coated with silica-based insulation having a high resistance and a high magnetic flux density, a manufacturing method thereof, and an electromagnetic circuit component are disclosed.

CITATION LIST

Patent Literature

Patent Literature 1: International Publication No. WO 2010/082486

Patent Literature 2: Japanese Unexamined Patent Publication No. 2017-188678

SUMMARY

Technical Problem

In Patent Literature 1, however, the contact between metal particles is unavoidable with decrease in the insulating material to achieve high density of a molded product, so that it is difficult to reduce magnetic loss. In Patent Literature 2, it is difficult to uniformly form a thin grain boundary layer having a thickness of 1 μm or less between metal particles, so that the high magnetic permeability and the low core loss are hardly obtained in parallel.

It is an object of the present invention, in the light of these circumstances, to provide a dust core having both of a low magnetic loss and a high magnetic permeability in parallel.

Solution to Problems

The dust core of the present invention comprises a plurality of soft magnetic iron-based particles, a coating layer disposed on each of the surfaces of the soft magnetic iron-based particles, an interstitial layer disposed between the coating layers, and a nanopowder disposed between the soft magnetic iron-based particles. The coating layer is a layer of a compound comprising Fe, Si, O, B and N; and the nanopowder is a powder of a compound comprising O, N and at least one element selected from the group consisting of Fe, Si, Zr, Co, Al, Mg, Mn and Ni.

The nanopowder may be a powder of a compound comprising Fe, Si, O and N.

Also, the nanopowder may have an average particle size of 10 to 200 nm.

Also, the coating layer may have an average thickness of 1 to 100 nm.

Also, the soft magnetic iron-based particles may have an average particle size of 1 to 100 μm.

Also, the soft magnetic iron-based particle may be an Fe—Si alloy particle and the dust core may have an apparent density of 6.6 g/cm$^3$ or more.

Advantageous Effects of Invention

According to the present invention, a dust core having a low magnetic loss and a high magnetic permeability is provided.

BRIEF DESCRIPTION OF THE DRAWING

FIG. 1 is an enlarged cross-sectional view of a dust core in an embodiment of the present invention.

DETAILED DESCRIPTION (Dust Core)

The dust core in an embodiment of the present invention is described. FIG. 1 is an enlarged cross-sectional view of a dust core in an embodiment of the present invention.

The dust core 100 in an embodiment of the present invention comprises a plurality of soft magnetic iron-based particles 10, a coating layer 20 disposed on each of the surfaces of the soft magnetic iron-based particles 10, an interstitial layer 40 disposed between the coating layers 20, and a nanopowder 30 disposed between the soft magnetic iron-based particles 10.

(Soft Magnetic Iron-Based Particle)

The soft magnetic iron-based particle is a particle having soft magnetic properties, comprising Fe as an element having a largest atomic fraction among elements in the particle. The atomic fraction of Fe may be 50 atom % or more.

Examples of the soft magnetic iron-based material include a pure iron, a carbonyl iron, an Fe—Si alloy, an Fe—Al alloy, an Fe—N compound, an Fe—Ni alloy, an Fe—C compound, an Fe—B compound, an Fe—Co alloy, an Fe—Al—Si alloy, an Fe—Al—Cr alloy, an Fe—Al—Mn alloy, an Fe—Al—Ni alloy, an Fe—Si—Cr alloy, an Fe—Si—Mn alloy, and an Fe—Si—Ni alloy. The soft magnetic iron-based material may be a crystalline material, an amorphous material, or a nanocrystalline material.

The average particle size of the soft magnetic iron-based particle 10 is not particularly limited, and may be 1 to 100 μm. The lower limit of the average particle size may be 3 μm or 5 μm. The upper limit may be 50 μm or 30 μm.

The average particle size of the soft magnetic iron-based particle 10 may be obtained by determining the individual cross-sectional areas of 30 pieces of the soft magnetic iron-based particles in an electron microscopic photograph (e.g., SEM) of a cross section of the dust core, and calculating the arithmetic mean of the individual equivalent diameters of equal-area circles.

Incidentally, the soft magnetic iron-based particle 10 may have one or a plurality of oxidized regions 10a inside, along an interface to the coating layer 20. For example, the oxidized region 10a may have a spherical shape, and may be present in a region at a depth of 500 nm from the interface. The diameter of the oxidized region 10a may be 1 to 20 nm. The diameter may be measured in the same manner as in the case of the diameter of nanopowder described below. Since the soft magnetic iron-based particle 10 includes the oxidized region 10*a* inside, the electrical resistivity increases and the eddy current loss in the particle is reduced. With a diameter of the oxidized region 10*a* of less than 1 nm, the effect of reducing the eddy current loss decreases. With a diameter of the oxidized region of more than 20 nm, the magnetic permeability tends to decrease.

(Coating Layer)

The coating layer 20 covers the surface of the soft magnetic iron-based particle 10. It is preferable that the coating layer 20 cover the entire surface of the soft magnetic iron-based particle 10.

The coating layer 20 may have an average thickness of 1 nm or more, preferably 5 nm or more, more preferably 10 nm or more. The coating layer 20 may have an average thickness of 100 nm or less, preferably 70 nm or less. With an excessively large thickness of the coating layer 20, the density after compression molding tends to decrease, while with an excessively small thickness, contact between the soft magnetic iron-based particles 10 in compression molding may be caused in some cases.

The average thickness of the coating layer 20 may be obtained as follows. From a cross-sectional photograph, 10 pieces of soft magnetic iron-based particles are randomly selected. In the cross-sectional photograph, an arithmetic mean A of the thickness measured at 10 points disposed at equal intervals along the interface between the respective soft magnetic iron-based particle and the coating layer is taken for each of the respective coating layers of the soft magnetic iron-based particles. An arithmetic means is further taken from the arithmetic means A for the coating layers of 10 pieces of the soft magnetic iron-based particles.

The coating layer is a layer having an electrical insulation, made of a compound comprising at least Fe, Si, O, B and N. Thus, the adhesion to the soft magnetic iron-based particle 10 is enhanced, and insulation increases.

(Interstitial Layer)

The interstitial layer 40 is a layer packed between the coating layers 20, binding the soft magnetic iron-based particles 10 having the coating layer 20 to each other. Examples of the material of the interstitial layer 40 include an epoxy resin, a phenol resin, a polyamide resin, and a silicone resin. The interstitial layer may be a thermoplastic resin, preferably a thermosetting resin. At least a part or all of the interstitial layer may be made of a thermally decomposed product of the resin.

(Nanopowder)

The nanopowder 30 is disposed between the soft magnetic iron-based particles 10. In other words, the nanopowder 30 may be disposed inside of the coating layer 20, may be disposed inside of the interstitial layer 40, or may be disposed at the interface between the coating layer 20 and the interstitial layer 40.

The nanopowder 30 has an average particle size of 200 nm or less. The upper limit of the average particle size may be 200 nm or 150 nm, being preferably 100 nm, more preferably 80 nm. The lower limit of the average particle size is not particularly specified, and may be 1 nm, being preferably 5 nm, more preferably 10 nm. The particle size of the nanopowder 30 is an equivalent diameter of equal-area circle in an electron microscopic photograph (e.g., TEM) of a cross section of the composite particle, and the average particle size may be an arithmetic mean of the particle sizes of about 30 pieces of the nanoparticles.

The nanopowder 30 is a powder of a compound comprising O (oxygen), N (nitrogen) and at least one element selected from the group consisting of Fe, Si, Zr, Co, Al, Mg, Mn and Ni. Since the nanopowder 30 is an oxynitride of metal and/or metalloid elements, the electrical insulation and the toughness are secured, which is desirable. In particular, due to containing N (nitrogen), the toughness is improved in comparison with an oxide, so that the contact between the soft magnetic iron-based particles is more easily inhibited even after compression.

The nanopowder may be made of a compound or composite particles. Examples of the compound may include a SiON powder (e.g., $Si_2N_2O$ powder), an AlON powder, an SiAlON powder, and a ZrON powder.

It is preferable that the nanopowder 30 be a powder of a compound comprising Fe, Si O and N. Since the nanopowder 30 is a compound comprising Fe and Si, magnetism is further exhibited, so that magnetic properties such as magnetic permeability are more improved.

Examples of the index relating to the dispersibility of the nanoparticles include an area ratio of the nanopowder in the TEM cross section of a dust core. The area ratio of the total area of nanoparticles relative to the area between the soft magnetic iron-based particles (area of coating layer and interstitial layer), i.e., (total area of nanoparticles/area between soft magnetic iron-based particles), in the TEM cross-sectional photograph, be preferably in the range of 10% or more and 50% or less, more preferably in the range of 10% or more and 40% or less. With an area ratio of 50% or less, the density of the dust core increases. With an area ratio of 10% or more, the insulation of the dust core is enhanced. It is preferable that the area between the soft magnetic iron-based particles in the TEM cross-sectional photograph be controlled in the range of 0.01 $\mu m^2$ to 0.1 $\mu m^2$.

In the case where the soft magnetic iron-based particle is an Fe—Si alloy particle, the dust core 100 may have an apparent density of 6.6 $g/cm^3$ or more, or 6.7 $g/cm^3$ or more. In the case where the soft magnetic iron-based particle is an Fe—Ni—Si alloy particle, it is preferable that the dust core 100 have an apparent density of 7.3 $g/cm^3$ or more. In the case where the soft magnetic iron-based material is a particle comprising 99.5 mass % or more of Fe such as carbonyl iron, it is preferable that the dust core 100 have an apparent density of 6.9 $g/cm^3$ or more. It is preferable that the packing ratio of the soft magnetic iron-based particle 10 contained in the dust core 100 be 88% or more. The packing ratio of the dust core is described below.

The shape of the dust core is not particularly limited. For example, a toroidal (ring-shaped) core, a cut core having a U-shape or the like, or a layered core for motors and inductors may be employed.

(Effect)

Since the dust core in the present embodiment has a coating layer 20 comprising Fe, Si, O, B and N, the electrical insulation between the soft magnetic iron-based particles 10 is enhanced. Also, since the nanopowder 30 such as an oxynitride of specific metal lies between the soft magnetic iron-based particles 10, more toughness is obtained in comparison with an oxide lying therebetween and the gap between the soft magnetic particles is easily secured even after high-pressure pressing. As a result, the contact between the soft magnetic iron-based particles is inhibited, so that the gap between the soft magnetic iron-based particles can be reduced while the electrical insulation is enhanced.

Thereby, the magnetic loss can be reduced while the magnetic permeability is enhanced.

(Method for Manufacturing Dust Core)

A first example of the method for manufacturing a dust core (external addition of nanopowder) is described.

First, a mixture powder of soft magnetic iron-based particles, a BN powder and a nanopowder is prepared. It is preferable that spherical soft magnetic iron-based particles be used. The spherical shape reduces the proximity points between the soft magnetic iron-based particles 10, so that the electrical insulation is easily secured.

It is preferable that the average particle size of the BN powder is sufficiently smaller than the soft magnetic iron-based particles, and may be, for example, 20 nm to 4 μm. It is preferable that the BN be a hexagonal crystal (h-BN). The average particle size of the soft magnetic iron-based particles and the BN powder is D50 of the volume-based particle size distribution measured by wet laser diffraction/dispersion method.

Next, the mixture powder is heat treated in a nitrogen atmosphere at about 400 to 700° C. Thereby, a coating layer 20 including the nanopowder 30 is formed on the surface of each of the soft magnetic iron-based particles, so that a composite particle is obtained.

Subsequently, the resulting composite particles and a binder raw material are mixed to obtain a mixture. On an as needed basis, a solvent in the binder raw material is dried.

Subsequently, a lubricant may be mixed into the mixture on an as needed basis. Examples of the lubricant include zinc stearate.

Next, a mold having a void corresponding to the shape of a dust core is filled with the mixture, and compression molding is performed to obtain the dust core in a desired shape. It is preferable that the lubricant be also applied to the inner surface of the mold in advance.

The pressure in compression molding is not particularly limited, and may be 981 to 1570 MPa.

After compression molding or during compression molding, heating may be performed to cure the binder raw material and/or anneal the soft magnetic iron-based particle on an as needed basis.

Subsequently, a second example of the method for manufacturing a dust core (internal synthesis of nanopowder) is described.

In the present embodiment, a mixture powder of soft magnetic iron-based particles and a BN powder is heat treated in nitrogen at 800 to 1100° C., preferably about 900 to 1000° C., to obtain a composite particle having the soft magnetic iron-based particles, the coating layer 20 disposed on the surface of the soft magnetic iron-based particles, and the nanopowder 30 disposed inside of the coating layer 20. The nanopowder 30 is able to be formed derived from the soft magnetic iron-based particles, so that no external addition is required.

The subsequent steps are the same as in the first method.

EXAMPLES

Example 1

A gas atomized Fe—Si (4.5 mass %) alloy powder having an average particle size of 5 μm, a BN powder having an average particle size of 4 μm, and an SiON powder having an average particle size of 180 nm were prepared. The Fe—Si alloy powder, the BN powder, and the SiON powder were mixed at a weight ratio of 50:10:1 to obtain a powder mixture.

Next, the powder mixture was placed in a crucible to be heat treated in a nitrogen atmosphere at 500° C. for 30 minutes, so that a composite particle was obtained with a coating layer of a compound comprising B, O, N, Fe and Si formed on the surface of the Fe—Si alloy powder, and a nanopowder of SiON disposed inside of the coating layer.

The unreacted BN powder and isolated SiON powder remaining on the composite particle was removed with alcohol.

To the resulting composite particles, a silicone resin was added to 1 wt %, mixed and dried. To the dried product, a lubricant (zinc stearate) was added to 0.1 wt % and further mixed. A mold coated with zinc stearate in advance was filled with 5 g of the final mixture for pressing at a molding pressure of 1570 MPa. The molded product was then annealed in a nitrogen atmosphere at 900° C. for 30 minutes to obtain a toroidal core as dust core. The packing ratio, the apparent density, the magnetic loss, and the relative magnetic permeability of the toroidal core were measured as follows.

The packing factor (A) was calculated based on a ratio of the apparent density (C) of a toroidal core relative to the true density (B) calculated based on the composition of metal and metalloid elements contained in the toroidal core, i.e., ($A=C/B\times100$).

The true density (B) was calculated from the sum of products of the mass ratio of metal and metalloid elements contained in the toroidal core and the density of each of the elements. For example, for the soft magnetic iron-based particles in Example 1, Example 6 and Example 7, the calculation is as follows.

In the case of Fe—Si (4.5 mass %) alloy particle in Examples 1 to 5 and Comparative Examples 1 and 2, the true density (B) is as follows: $(7.87\times(100.0-4.5)+2.33\times4.5)/100=7.62$ g/cm$^3$.

In the case of Fe—Ni (47.0 mass %)-Si (1.0 mass %) alloy particle in Example 6 and Comparative Examples 3 and 4, the true density (B) is as follows: $(7.87\times(100.0-47.0-1.0)+8.90\times47.0+2.33\times1.0)/100=8.30$ g/cm$^3$.

In the case of Fe (99.5 mass %) particle in Example 7 and Comparative Examples 5 and 6, the true density (B) is as follows: $7.87\times0.995=7.83$ g/cm$^3$.

The apparent density was calculated based on the measurement of the dimension and the weight of the toroidal core.

The magnetic permeability was measured as follow. Using an LCR meter "4284A" manufactured by Agilent Technologies and a DC bias power supply "42841A" manufactured by Agilent Technologies, the inductance of the dust core at a frequency of 20 kHz was measured, and the magnetic permeability of the dust core at room temperature was calculated from the inductance. The measurement was performed at a DC superimposed magnetic field of 8000 A/m.

The magnetic loss was measured as follows. Using a BH analyzer "SY8258" manufactured by Iwasaki Electric Co., Ltd., a sinusoidal AC magnetic field at a maximum of 50 mT was applied to measure the loss at room temperature at 500 kHz.

It is preferable that the magnetic loss be 1200 kW/m$^3$ or less, and the relative magnetic permeability be 45 or more.

In the cross section of the dust core, the area ratio of the nanopowder (total area of nanopowders/area between soft magnetic iron-based particles) was measured. The dust core was cut by FIB "Nova 200i" manufactured by FEI Company Japan, Ltd., to prepare a thin sample, which was observed by STEM-EDS "JEM2100FCS" manufactured by JEOL. The STEM image observed by STEM was subjected to respective measurement of the area between the soft magnetic iron-based particles and the area of the nanopowder, using an image analysis software "Pixs2000Pro (ver. 2. 2. 2)"

manufactured by Innotech Corporation. Five TEM photographs taken at different places in the cross section of a core dust were prepared to measure the respective area ratios, from which an arithmetic means was obtained.

Comparative Example 1

A toroidal core in Comparative Example 1 was obtained in the same manner as in Example 1, except that the weight ratio of the Fe—Si alloy powder to the BN powder was controlled to 1:1, and no SiON powder was used.

Comparative Example 2

To a gas atomized Fe—Si (4.5 mass %) alloy powder having an average particle size of 5 μm, an alcohol solution containing 2 wt % of SiON powder relative to the weight of the Fe—Si powder and 1 wt % of phosphoric acid relative to the weight of the Fe—Si powder was supplied, and alcohol was then dried, so that an iron phosphate coating layer including the nanopowder was formed on the surface of the Fe—Si alloy powder. Hereafter, a toroidal core in Comparative Example 2 was obtained in the same manner as in Example 1.

Example 2

A gas atomized Fe—Si (4.5 mass %) alloy powder having an average particle size of 5 μm and a BN powder having an average particle size of 4 μm were prepared. The Fe—Si alloy powder and the BN powder were mixed at a weight ratio of 5:1 to obtain a powder mixture.

Next, the powder mixture was placed in a crucible, and a heat treatment in a nitrogen atmosphere at 900° C. for 30 minutes was performed, so that a composite particle was obtained with a coating layer of a compound comprising B, O, N, Fe and Si formed on the surface of the Fe—Si alloy powder, and a nanopowder of a compound comprising 0, N, Si and Fe disposed inside of the coating layer. Hereafter, a toroidal core in Example 2 was obtained in the same manner as in Example 1, except that no SiON powder was added.

Example 3

A toroidal core in Example 3 was obtained in the same manner as in Example 2, except that a gas atomized Fe—Si (4.5 mass %) alloy powder having an average particle size of 10 μm was used.

Example 4

A toroidal core in Example 4 was obtained in the same manner as in Example 2, except that the weight ratio of the Fe—Si alloy particle to the BN powder was controlled to 1:1.

Example 5

A toroidal core in Example 5 was obtained in the same manner as in Example 2, except that the weight ratio of the Fe—Si alloy particle to the BN powder was controlled to 100:1.

Example 6

A gas atomized Fe—Ni (47.0 mass %)-Si (1.0 mass %) alloy powder having an average particle size of 5 μm and a BN powder having an average particle size of 4 μm were prepared. The Fe—Ni—Si alloy powder and the BN powder were mixed at a weight ratio of 5:1 to obtain a powder mixture.

Next, the powder mixture was placed in a crucible, and a heat treatment in a nitrogen atmosphere at 1100° C. for 60 minutes was performed, so that a composite particle was obtained with a coating layer of a compound comprising B, O, N, Fe and Si formed on the surface of the Fe—Ni—Si alloy powder, and a nanopowder of a compound comprising 0, N, Si and Fe disposed inside of the coating layer.

The unreacted BN powder remaining on the composite particle was removed with alcohol.

To the resulting composite particles, a silicone resin was added to 1 wt %, mixed and dried. To the dried product, a lubricant (zinc stearate) was added to 0.1 wt % and further mixed. A mold coated with zinc stearate in advance was filled with 5 g of the final mixture, and pressing was performed at a molding pressure of 1570 MPa. Annealing was then performed in a nitrogen atmosphere at 600° C. for 30 minutes to obtain a toroidal core as dust core.

Comparative Example 3

A composite particle was prepared in the same manner as in Example 1, except that the Fe—Ni—Si alloy powder in Example 6 was used as the soft magnetic iron-based particle, the weight ratio of the Fe—Ni—Si alloy powder to the BN powder was controlled to 1:1, and no SiON powder was used. A toroidal core in Comparative Example 3 was then obtained in the same manner as in Example 1, except that annealing conditions at 600° C. for 30 minutes were employed.

Comparative Example 4

To the Fe—Ni—Si alloy powder in Example 6, an alcohol solution containing 2 wt % of SiON powder relative to the weight of the Fe—Ni—Si powder and 1 wt % of phosphoric acid relative to the weight of the Fe—Ni—Si powder was supplied, and alcohol was then dried, so that an iron phosphate coating layer including the nanopowder was formed on the surface of the Fe—Ni—Si powder. Hereafter, a toroidal core in Comparative Example 4 was obtained in the same manner as in Example 6.

Example 7

A carbonyl iron powder (Fe: 99.5 mass %) having a particle size of 4 μm, a BN powder having a particle size of 4 μm, and TEOS ($SiO(C_2H_5)4$) were prepared. The carbonyl iron powder, the BN powder and TEOS were mixed at a weight ratio of 5:1:0.01 to obtain a powder mixture.

Next, the powder mixture was placed in a crucible, and a heat treatment in a nitrogen atmosphere at 750° C. for 30 minutes was performed, so that a composite particle was obtained with a coating layer of a compound comprising B, O, N, Fe and Si formed on the surface of the carbonyl iron powder, and a nanopowder of a compound comprising 0, N, Si and Fe disposed inside of the coating layer.

The unreacted BN powder remaining on the composite particle was removed with alcohol.

To the resulting composite particles, a silicone resin was added to 1 wt %, mixed and dried. To the dried product, a lubricant (zinc stearate) was added to 0.1 wt % and further mixed. A mold coated with zinc stearate in advance was filled with 5 g of the final mixture, and pressing was performed at a molding pressure of 980 MPa. Annealing was then performed in a nitrogen atmosphere at 750° C. for 30 minutes to obtain a toroidal core as dust core.

Comparative Example 5

A composite particle was prepared in the same manner as in Example 1, except that the carbonyl iron powder in Example 7 was used as the soft magnetic iron-based particles, the weight ratio of the carbonyl iron powder to the BN powder was controlled to 1:1, and no SiON powder was used. A toroidal core in Comparative Example 5 was then obtained in the same manner as in Example 1, except that a molding pressure of 980 MPa and annealing conditions at 750° C. for 30 minutes were employed.

Comparative Example 6

To the carbonyl iron powder in Example 7, an alcohol solution containing 2 wt % of SiON powder relative to the weight of the carbonyl iron powder and 1 wt % of phosphoric acid relative to the weight of the carbonyl iron powder was supplied, and alcohol was then dried, so that an iron phosphate coating layer including the nanopowder was formed on the surface of the carbonyl iron powder. Hereafter, a toroidal core in Comparative Example 6 was obtained in the same manner as in Example 7.

The conditions and the results are shown in Table 1 and Table 2. Incidentally, the compositions of a compound of the coating layer and the nanopowder were confirmed by line analysis and point analysis using STEM-EDS. A thin sample was prepared from the dust core by FIB "Nova200i" manufactured by FEI Company Japan, Ltd., so as to be observed by STEM-EDS "JEM2100FCS" manufactured by JEOL. The thickness of the coating layer was measured at 10 points of each of 10 particles to obtain an average.

A TEM image of the cross section of the dust core was analyzed using a freeware QMP (ver. 2. 0. 1) to measure the particle size of the nanoparticle as the diameter of a circle having an area equal to the area of the particle, and an average of 30 pieces was obtained.

TABLE 1

| | Soft magnetic iron-based particles | | Nanopowder | | Coating layer | |
|---|---|---|---|---|---|---|
| | Mass composition | Average particle size [μm] | Composition | Particle size [nm] | Composition | Thickness [nm] |
| Example 1 | Fe—4.5Si | 5 | Si, O, N | 180 | Fe, Si, B, O, N | 15 |
| Comparative Example 1 | Fe—4.5Si | 5 | Null | — | Fe, Si, B, O, N | 50 |
| Comparative Example 2 | Fe—4.5Si | 5 | Si, O, N | 180 | Fe, P, O | 40 |
| Example 2 | Fe—4.5Si | 5 | Fe, Si, O, N | 50 | Fe, Si, B, O, N | 25 |
| Example 3 | Fe—4.5Si | 10 | Fe, Si, O, N | 140 | Fe, Si, B, O, N | 70 |
| Example 4 | Fe—4.5Si | 5 | Fe, Si, O, N | 50 | Fe, Si, B, O, N | 50 |
| Example 5 | Fe—4.5Si | 5 | Fe, Si, O, N | 50 | Fe, Si, B, O, N | 10 |
| Example 6 | Fe—47.0Ni—1.0Si | 5 | Fe, Si, O, N | 90 | Fe, Si, B, O, N | 30 |
| Comparative Example 3 | Fe—47.0Ni—1.0Si | 5 | Null | — | Fe, Si, B, O, N | 80 |
| Comparative Example 4 | Fe—47.0Ni—1.0Si | 5 | Si, O, N | 180 | Fe, P, O | 40 |
| Example 7 | 99.5Fe | 4 | Fe, Si, O, N | 120 | Fe, Si, B, O, N | 80 |
| Comparative Example 5 | 99.5Fe | 4 | Null | — | Fe, Si, B, O, N | 100 |
| Comparative Example 6 | 99.5Fe | 4 | Si, O, N | 180 | Fe, P, O | 40 |

TABLE 2

| | Dust core | | | | |
|---|---|---|---|---|---|
| | Proportion of area of nanoparticles in area between iron-based particles [%] | Apparent density [g/cm$^3$] | Packing factor | Magnetic loss at 500 kHz [kW/m$^3$] | Relative magnetic permeability at 8000 A/m, 20 kHz |
| Example 1 | 26 | 6.809 | 89% | 819 | 51 |
| Comparative Example 1 | — | 6.590 | 86% | 1177 | 42 |
| Comparative Example 2 | 25 | 6.598 | 87% | 1327 | 39 |
| Example 2 | 21 | 6.709 | 88% | 875 | 50 |
| Example 3 | 48 | 6.850 | 90% | 1116 | 50 |
| Example 4 | 38 | 6.752 | 89% | 1057 | 45 |
| Example 5 | 15 | 6.860 | 90% | 978 | 52 |
| Example 6 | 31 | 7.371 | 89% | 1108 | 73 |
| Comparative Example 3 | — | 7.052 | 85% | 1990 | 39 |
| Comparative Example 4 | 25 | 7.122 | 86% | 1830 | 41 |
| Example 7 | 24 | 7.010 | 90% | 1102 | 58 |

TABLE 2-continued

| | Dust core | | | | |
|---|---|---|---|---|---|
| | Proportion of area of nanoparticles in area between iron-based particles [%] | Apparent density [g/cm$^3$] | Packing factor | Magnetic loss at 500 kHz [kW/m$^3$] | Relative magnetic permeability at 8000 A/m, 20 kHz |
| Comparative Example 5 | — | 6.589 | 84% | 2890 | 26 |
| Comparative Example 6 | 22 | 6.748 | 86% | 2401 | 15 |

In Examples 1 to 7, a toroidal core having a high relative magnetic permeability and a low magnetic loss in parallel was obtained. In contrast, in Comparative Examples 1 to 7, improvement in the relative magnetic permeability was insufficient.

REFERENCE SIGNS LIST

10: SOFT MAGNETIC IRON-BASED PARTICLES, 20: COATING LAYER, 30: NANOPOWDER, 40: INTERSTITIAL LAYER, 100: DUST CORE

What is claimed is:

1. A dust core comprising:
  a plurality of soft magnetic iron-based particles;
  a coating layer disposed on each of the surfaces of the soft magnetic iron-based particles;
  an interstitial layer disposed between the coating layers; and
  a nanopowder disposed between the soft magnetic iron-based particles,
  wherein the coating layer is a layer of a compound comprising Fe, Si, O, B and N; and
  the nanopowder is a powder of a compound comprising O, N and at least one element selected from the group consisting of Fe, Si, Zr, Co, Al, Mg, Mn and Ni.

2. The dust core according to claim 1, wherein the nanopowder is a powder of a compound comprising Fe, Si, O and N.

3. The dust core according to claim 1, wherein the nanopowder has an average particle size of 10 to 200 nm.

4. The dust core according to claim 1, wherein the coating layer has an average thickness of 1 to 100 nm.

5. The dust core according to claim 1, wherein the soft magnetic iron-based particle has an average particle size of 1 to 100 μm.

6. The dust core according to claim 1, wherein the soft magnetic iron-based particle is an Fe—Si alloy particle and the dust core has an apparent density of 6.6 g/cm$^3$ or more.

* * * * *